Figure 1:
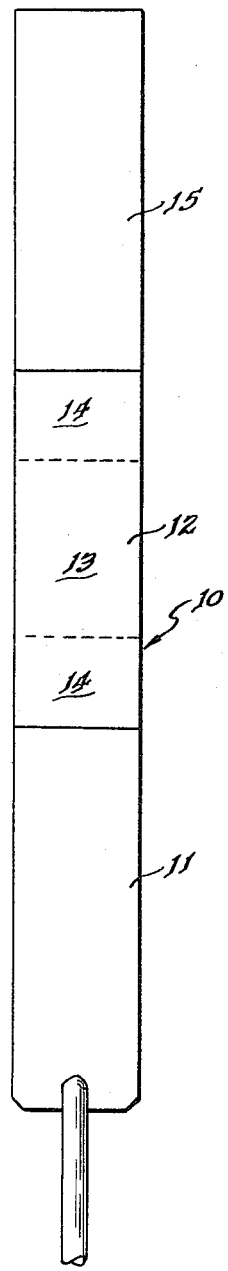

Aug. 16, 1966     L. W. FROMM, JR., ET AL     3,267,002

METHOD FOR CONTROLLING A NUCLEAR REACTOR

Filed Jan. 28, 1965

Legend:
——————— Total control required
—·—·—·— Control in combination rods
———————— Control in normal control rods.

INVENTORS
Leonard W. Fromm, Jr.
Charles N. Kelber
By:
Roland G. Anderson
Attorney 3,267,002
METHOD FOR CONTROLLING A
NUCLEAR REACTOR
Leonard W. Fromm, Jr., Glen Ellyn, and Charles N. Kelber, Wheaton, Ill., assignors to the United States of America as represented by the United States Atomic Energy Commission
Filed Jan. 28, 1965, Ser. No. 428,886
2 Claims. (Cl. 176—22)

The invention described herein was made in the course of, or under, a contract with the United States Atomic Energy Commission.

This invention relates to control of a nuclear reactor. In more detail the invention relates to control of a thermal or epithermal reactor having a high power density. In still more detail the invention relates to a method of controlling a high-power-density, epithermal reactor whereby major distortions of axial flux pattern within the reactor are avoided. The invention also relates to a control element which may be employed in performing the method.

Conventional control elements are usually inserted into a reactor core from the top or bottom. In high-power-density reactors at the time of maximum reactivity the required insertion may be sufficient to produce a major distortion of the flux pattern of the reactor. For example, in the Argonne Advanced Research Reactor, where control elements are inserted from the top, the upper half of the reactor core is essentially shut down at the time of maximum reactivity and the lower half of the core produces most of the power. Using conventional control elements only in this reactor, it would be necessary to limit the power to prevent burnout or flow instability.

The invention will be specifically described hereinafter as applied to the Argonne Advanced Research Reactor—a high-power-density epithermal reactor having a very high thermal neutron flux—scheduled for construction at Argonne National Laboratory. The entire reactor is described in Patent No. 3,149,043, issued September 15, 1964 in the names of Lester Goldstein, Leon Joseph, Morton S. Silberstein and Albert A. Weinstein, only the design of the core being claimed therein.

Since AARR—the Argonne Advanced Research Reactor, is designed to produce a very high thermal neutron flux, it has a very high power and requires that a large amount of excess reactivity be built into the core. As is now conventional in the art, burnable poison is employed in the core to compensate in large part for this excess reactivity. Unfortunately it is not possible to obtain a perfect match between the excess reactivity of the reactor and the burnable poison. Thus, at the start of operation of the reactor the excess reactivity of the fuel and the negative reactivity of the burnable poison are approximately equal. The burnable poison, however, disappears initially faster than does the reactivity associated with the fuel. Excess reactivity therefore gradually increases and reaches its peak about the midpoint in core life. As operation continues, the reactivity associated with the fuel disappears faster than the negative reactivity associated with the burnable poison and the excess reactivity decreases until the core can no longer support a chain reaction. There is also an initial peak in excess reactivity caused by xenon buildup in the core. Thus, immediately following startup of the reactor, excess reactivity drops to a minimum as xenon builds up in the core, then excess reactivity increases to a maximum as burnable poison disappears faster than the fuel, and finally excess reactivity falls off again.

It will be appreciated that the present invention can be employed in connection with any thermal or epithermal reactor regardless of power density. However, other expedients are available to avoid distortions of the axial flux pattern in reactors having relatively low power densities and such expedients would probably be selected in preference to this invention. Similarly the invention can be used regardless of whether a burnable poison is present in the reactor or not. If no burnable poison is present, excess reactivity does not build up to a peak but rather drops off in essentially a straight line from beginning to end of core life. Again, however, it is most likely that any reactor having a high enough power density to make use of this invention desirable would include burnable poison in the core.

It is accordingly an object of the present invention to provide a method of controlling a nuclear reactor which reduces axial flow distortion caused by insertion of the control elements.

It is also an object of the present invention to provide a method of controlling a thermal or epithermal reactor having a high power density by which method the ratio of maximum heat flux at any point in the core to the average heat flux over the entire core is reduced.

It is a further object of the present invention to develop a control element with which this method can be performed.

These and other objects of the present invention are attained by varying the amount of control material at the axial center of the reactor in large increments, after each such incremental variation moving conventional control elements axially an amount sufficient to compensate for said incremental variation, and moving the conventional control elements to control the reactor between incremental variations in the amount of control material at the axial center of the reactor. Conveniently, a control element including a central neutron-absorbing section and outer lesser absorbing sections attached above and below the absorbing section may be used in performing the invention.

Figure 2:
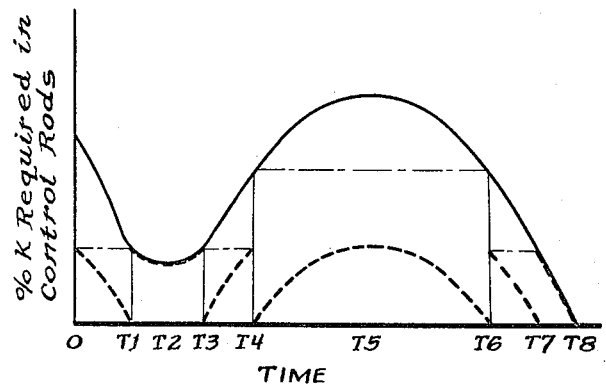

The invention will next be described in connection with the accompanying drawing wherein:

FIG. 1 is a perspective view of a control element according to the present invention and FIG. 2 is a graph illustrating use of this control element in performing the method of the present invention.

Referring now to the drawing, control element 10 is a three-section element having a length approximately three times the axial core height. The lowermost or follower section 11 of the element is made of a nonabsorbing material such as Zircaloy-II and serves to fill the control rod channel and prevent flux peaking in the channel and adjacent fuel elements. The central or control section 12 of the control element 10 in turn consists of three portions of which the center portion 13 is formed of such a material as dysprosium or europium oxide dispersed in stainless steel or of hafnium metal so as to be "black" to thermal neutrons—that is, absorb all neutrons incident thereupon—and the upper and lower portions 14 are formed of such a material as tantalum or rhodium so as to be "gray" to thermal neutrons—that is, absorb only a portion of the neutrons incident thereupon. The total length of section 12 is about the same as the height of the core while the length of portion 13 is about half the height of the core. The upper or safety section 15 is also formed of a material such as dysprosium or europium oxide dispersed in stainless steel or of hafnium metal so as to be "black" to thermal neutrons.

Control elements 10 are thus designed to serve in the dual function of safety element and control element and, for convenience, will hereinafter be called combination elements. They are always positioned such that one of the three sections 11, 12 and 15 is wholly within the reactor core. There are no intermediate positions except when the element is being moved from one position to another. Therefore other control elements of conventional nature consisting of an absorber section at the top and a follower section at the bottom are also employed in the reactor.

Use of the combination element in performing the method of the present invention to control the Argonne Advanced Research Reactor will next be described. AARR incorporates burnable posion and has a large control element requirement during the period of initial xenon buildup. Thus, as shown in FIG. 2, initially the total control required at inception of operation is relatively high, then the control required falls off to a minimum, then increases to a maximum and finally falls off to zero. The invention will be described employing two banks of combination elements.

Referring now to FIG. 2, at time $t_0$ control sections 12 of one bank of combination elements is inserted and the reactor is brought critical by withdrawing the normal control elements. During this period the total control requirement (solid curve) is met by the sum of the constant negative reactivity represented by these control sections 12 and the variable negative reactivity represented by the gradually moving normal control elements. At time $t_1$ this bank of combination elements is withdrawn so that the follower section 11 is in the reactor core and the normal control elements are inserted to compensate for the loss of control. From time $t_1$ to time $t_3$ total control requirements may be met by movement of the normal control elements. Then at time $t_3$ one bank of combination elements is inserted to the control position and the normal control elements withdrawn to bring the reactor back to criticality. Between time $t_3$ and $t_4$ the normal control elements are gradually inserted to compensate for the increasing reactivity due to burnout of the burnable poison. At time $t_4$ the second bank of combination elements is inserted to the control position and the normal elements withdrawn. From time $t_4$ to $t_6$ control is obtained by movement of the normal control elements with the control requirements being met by the sum of the fixed negative reactivity obtained from the two banks of combination elements and the variable negative reactivity obtained from the normal control elements. At time $t_6$ one bank of combination elements is withdrawn and at time $t_7$ the other bank is withdrawn and the normal control elements are adjusted to compensate for the change. When both banks of combination elements and the normal control elements are fully withdrawn, the excess reactivity of the core is completely consumed and core life is ended.

The control element shift required at time $t_1$ can be accomplished either by shutting down the reactor momentarily, inserting the normal control elements completely, withdrawing the combination elements, and bringing the reactor critical again with the normal control elements or by gradually withdrawing the combination elements and simultaneously inserting the normal control elements to maintain criticality of the reactor. The reverse shift required at time $t_3$ can be accomplished in a similar manner.

Obviously the invention can be carried out using any number of banks of combination elements. The greater the number of banks into which the combination elements are divided, the greater will be the flattening effect, up to a practical limit. The choice of the number of banks must therefore be based upon practical and economic considerations. If a weaker absorber in the control portion of the center section of the combination element is needed, this center portion may be constructed of a material which is "gray" to thermal neutrons and the outer portions formed of a nonabsorbing material. With this design, the over-all length of the combination element may be somewhat less than three times core height, since the lower nonabsorbing portion of the control section may also serve as part of the follower section of the combination element. Use of this combination element is, of course, the same as that of the combination element previously described.

Use of the combination elements as safety rods is conventional. At any point during core life, regardless of the operating position of the combination elements, the elements may be scrammed in a normal manner. Because of the arrangement of the materials in the central control section, there may be a tendency toward a slight power surge as the element is inserted. However, since the normal control elements will be scrammed simultaneously, it is anticipated that the insertion of the absorber section of the normal elements will be sufficient to compensate for the surge tendency.

The method of the present invention can be employed in connection with the operation of any thermal or epithermal reactor regardless of whether a burnable poison is employed in the reactor core or whether there is an initial drop in reactivity due to xenon buildup. If no burnable poison is included in the reactor core, all banks of combination elements are inserted to the control position at the start of operation. As core life proceeds, the banks of combination elements are withdrawn periodically (with compensating shifts of normal control elements) until all are withdrawn near the end of core life. In a reactor which does not have a large control element insertion requirement at the start of operation, the method involves only that part of the graph (FIG. 2) extending between time $t_2$ and time $t_8$.

It is thus apparent that the above-described invention satisfies the objects of the present invention. Because the major part of the absorber in the control section of the combination elements is positioned in the axial center of the core, the flux is shifted towards the ends of the core and the flux is thereby flattened. Also the reduced requirement for normal control element insertion reduces the flux distortion inherent in such insertion. The net result is a much smaller variation of flux with axial position in the core and a lower ratio of maximum to average heat flux. The core can therefore be operated at a relatively high power level for a given maximum heat flux limitation.

It will be understood that the invention is not to be limited to the details given herein but that it may be modified within the scope of the appended claims.

The embodiments of the invention in which an exclusive property or privilege is claimed are defined as follows:

1. A method of controlling a nuclear reactor comprising varying the amount of a control material at the axial center of the reactor in large increments, after each such incremental variation moving conventional control rods axially an amount sufficient to compensate for said incremental variation, and moving the conventional control rods to control the reactor between incremental variations in the amount of control material at the axial center of the reactor, whereby axial flux distortion caused by conventional control rods is minimized.

2. A method of controlling a high-power-density epithermal reactor incorporating a burnable poison comprising moving conventional control rods axially into the reactor to compensate for the increase in reactivity therein as burnable poison burns out faster than the fuel, then introducing control material into the axial center of the reactor and moving the control rods out until the chain reaction starts again, then moving the conventional control elements into the reactor as the reactivity increases, if necessary introducing additional control material at the center of the reactor, then withdrawing control elements as the reactivity of the reactor decreases, when criticality of the reactor can no longer be maintained by further movement of the control rods, inserting the control rods again and removing the control material from the axial center of the reactor and withdrawing the control elements to maintain criticality of the reactor, whereby axial flux distortion is minimized within the reactor.

References Cited by the Examiner

UNITED STATES PATENTS 2,990,353　6/1961　Howard et al. _____ 176—25

FOREIGN PATENTS 861,975　3/1961　Great Britain.

References Cited by the Applicant

UNITED STATES PATENTS 2,952,600　9/1960　Newson.
3,068,161　12/1962　Cawley.
3,081,248　3/1963　Grant.

L. DEWAYNE RUTLEDGE, *Primary Examiner.*

H. E. BEHREND, *Assistant Examiner.*